United States Patent [19]

Seiver et al.

[11] Patent Number: 4,457,836
[45] Date of Patent: Jul. 3, 1984

[54] SUPPORTED, NON (METAL-PROMOTED) CARBON-CONTAINING MOLYBDENUM SULFIDE CATALYSTS FOR SELECTIVE NITROGEN REMOVAL

[75] Inventors: Robert L. Seiver, Baton Rouge, La.; Charles Rebick, Annandale, N.J.; Duane A. Goetsch, Baton Rouge, La.

[73] Assignee: Exxon Research and Engineering Company, Florham Park, N.J.

[21] Appl. No.: 494,539

[22] Filed: May 13, 1983

[51] Int. Cl.$^3$ ............................................. C10G 45/04
[52] U.S. Cl. ................................ 208/254 H; 208/289
[58] Field of Search ............................ 208/254 H, 289

[56] References Cited

U.S. PATENT DOCUMENTS

| | | | |
|---|---|---|---|
| 2,112,292 | 3/1938 | Jones | 423/53 X |
| 2,490,488 | 12/1949 | Stewart | 260/449.6 |
| 2,686,763 | 8/1954 | Johnson et al. | 252/439 X |
| 3,876,755 | 4/1975 | Kurtak et al. | 423/56 |
| 4,066,530 | 1/1978 | Aldridge et al. | 208/112 |
| 4,098,839 | 7/1978 | Wilms et al. | 252/439 X |
| 4,134,825 | 1/1979 | Bearden et al. | 208/108 |
| 4,243,553 | 1/1981 | Naumann et al. | 252/439 |
| 4,243,554 | 1/1981 | Naumann et al. | 252/439 |

FOREIGN PATENT DOCUMENTS 7603197  9/1976  Netherlands ..................... 252/439

OTHER PUBLICATIONS

Thermal Decomposition of $(NH_4)_2MoO_2S_2$, T. P. Prasad et al., J. Eng. Chem., 1973, vol. 35, pp. 1845–1904.
Mills & Steffgen, Cat. Rev. 8, 159 (1973).
Noble Metals, Mo & W in Hydrocarbon Synthesis, J. F. Shultz et al., Report 6947, Jul. 1967.
Angrew, Chem. Int. Ed. Engl. 17,279 (1978).

*Primary Examiner*—Delbert E. Gantz
*Assistant Examiner*—O. Chaudhuri
*Attorney, Agent, or Firm*—Llewellyn A. Proctor

[57] ABSTRACT

A process for selectively removing nitrogen from petroleum distillate feedstocks, notably lube oil distillates or lube base stocks without significant desulfurization of said petroleum distillate feedstocks, especially lube oil distillates or lube base stocks, while hydrotreating the oil to improve odor, color, improve stability, and the like. In accordance therewith, a supported, non (metal-promoted) carbon-containing molybdenum sulfide HDN/HDS selective hydrotreating catalyst is formed from a precursor composite made by compositing a preselected quantity of a porous, refractory inorganic oxide with a complex salt characterized by the formula $B_x[MoO_yS_{4-y}]$ where B is (a) an alkyl substituted diammonium ion, or (2) an alkyl substituted ammonium ion or quaternary ammonium ion; x is 1 where B is an alkyl substituted diammonium ion, or 2 where B is an alkyl substituted ammonium or quaternary ammonium ion; and y is 0, or a fraction or whole number ranging up to 3. The supported, non (metal-promoted) carbon-containing molybdenum sulfide HDN/HDS selective lube oil hydrotreating catalyst is then formed from the precursor composite by heating said composite, and heat decomposing the salt of said catalyst precursor composite in the presence of hydrogen, hydrocarbon and sulfur.

9 Claims, No Drawings

SUPPORTED, NON (METAL-PROMOTED) CARBON-CONTAINING MOLYBDENUM SULFIDE CATALYSTS FOR SELECTIVE NITROGEN REMOVAL

BACKGROUND OF THE INVENTION

I. Field of the Invention

This invention relates to a process which utilizes supported, non (metal-promoted) carbon-containing molybdenum sulfide catalysts for the selective removal of nitrogen in the processing of lube oil base stocks and distillates.

II. Background and Prior Art

Lube oils and specialty oils are made by blending together lube base stocks and additives. Lube base stocks are obtained by distillation from a crude hydrocarbon admixture, the lube distillate meeting the required viscosity and boiling range specifications. Chemical additives are then used to enhance certain properties of the lube base stocks or to add characteristics not present in the lube base stocks.

These oils differ widely in quality, and are selected to serve specific uses, dependent on the type of service to which the oil is to be subjected. Quality differences are achieved in large part by a selection of crude oil source, type of crude oil, and the viscosity of the lube distillate fraction. Motor and aviation oils, e.g., must show the least possible change in viscosity with temperature. They must provide equally good lubrication at cold start-up and at high operating temperatures. Industrial oils must be stable over long periods, though change in viscosity with temperature is less critical than with motor and aviation oils. Specialty oils, on the other hand, require properties other than, or in addition to, those of providing good lubrication. Thus, e.g., transformer oils, medicinal white oils and hydraulic fluids differ widely in their required properties.

Lube oil distillates, obtained from fractions taken from a vacuum pipestill, are constituted principally of paraffins, isoparaffins, naphthenes and aromatics. The predominant molecular structures in these distillates are naphthene ring compounds, especially naphthene-aromatic compounds containing from one to about six rings to which paraffin chains are attached. Lube oil distillates also contain sulfur, and nitrogen as impurities. Normal paraffins are generally removed from the oils during processing. Oxygen can lead to the production of oxidation products under the conditions at which internal combustion engines are operated, these products often being acidic in nature and highly corrosive. Oxidation products also form polymeric materials, and act as sludge binders which hold together the water of combustion, lead salts, carbon and road dust which may impair ring performance, and plug oil lines and filters.

Sulfur can also lead to the formation of oxidation products. Much of the sulfur contained in the lube oil distillate, however, is contained inside the ring structures of compounds which impart desirable lubricity and stability characteristics to the lube oil, and accordingly removal of this type of sulfur from the lube oil is undesirable. Chemical additions, for this reason, are often made to impart to the lube oil resistance to oxidation and thermal degradation of the lubricants. These additives, in fact, often include sulfur compounds such as the sulfurized terpenes, phosphosulfurized materials such as the phosphosulfurized terpenes and the zinc dialkyldithiophosphonates. Nitrogen, on the other hand, can be detrimental in lube oils. It is therefore desirable to remove as much of the nitrogen as possible from a lube oil distillate before it is blended to form a lube base stock.

Hydrocarbon oils are generally hydrotreated, this removing sulfur and nitrogen from the oil. The removal of nitrogen is desirable and, as suggested, the removal of a significant amount of sulfur is undesirable and even detrimental in the manufacture of lube base stocks. Conventional hydrotreating catalysts offer poor flexibility with regard to nitrogen/sulfur selectivity, and the vast preponderance of these catalysts are very highly selective for the removal of sulfur, more so generally than for the removal of nitrogen. Most thus remove both sulfur and nitrogen, generally more sulfur than nitrogen. Only a modest increase is possible in nitrogen selectivity vis-a-vis sulfur selectivity by using, e.g., conventional nickel-molybdenum-on-alumina catalysts as opposed to conventional cobalt-molybdenum-on-alumina catalysts, or by operating at abnormally elevated pressures, but the range of selectivity control is quite limited.

Supported carbon-containing molybdenum sulfide and tungsten sulfide catalysts such as disclosed in application Ser. Nos. 400,004 and 400,005, by Robert L. Seiver and Russell R. Chianelli, both filed July 20, 1982, have been found useful as hydrotreating and methanation catalysts. These catalysts are prepared from precursors formed by supporting on a porous, refractory inorganic oxide carrier, a complex salt characterized by the formula $B_x[Mo_yS_{4-y}]$ where B is an organo or hydrocarbyl substituted diammonium ion, an organo or hydrocarbyl substituted ammonium ion or quaternary ammonium ion, or an ionic form of a cyclic amine containing one or more basic N atoms; x is 1 where B is an organo or hydrocarbyl substituted diammonium ion, or 2 where B is an organo or hydrocarbyl substituted ammonium or quaternary ammonium ion or an ionic form of a cyclic amine containing one or more basic N atoms; M is molybdenum or tungsten; and y is 0, or a fraction or whole number ranging up to 3. The catalysts are formed by heat decomposing the salt of said catalyst precursor composite (1) in the presence of hydrogen, hydrocarbon and sulfur, or (2) in the presence of hydrogen and hydrogen sulfide. The precise nature, and composition of the catalyst species that is formed on the support as a reaction product of the decomposition reaction is not known, but it is believed that a catalyst species having the general formula $MS_{2-z}C_{z'}$, wherein M is molybdenum or tungsten, and z and z' are the same or different and range from about 0.01 to about 0.5. The surface composition, or composition deposited on the surface of the support, is believed to correspond generally with the unsupported catalyst species defined in application Ser. Nos. 399,999 and 399,991, each jointly filed by Theresa R. Pecoraro and Russell R. Chianelli, and Russell R. Chianelli and Theresa R. Pecoraro, respectively, also on July 20, 1982. As a class these catalysts are active for the hydrodenitrogenation (HDN) and the hydrodesulfurization (HDS) of hydrocarbon feedstocks which contain relatively high concentrations of sulfur, or nitrogen, or both. The catalysts hydrodenitrogenate hydrocarbon feeds, and have offered a considerably wider range of HDN/HDS selectivity than conventional prior art catalysts.

SUMMARY OF THE INVENTION

The present invention is based on the discovery that certain selected catalysts of the supported catalyst species disclosed in application Ser. Nos. 400,004 and 400,005, supra, can selectively remove nitrogen from petroleum distillate feedstocks, notably lube oil distillates or lube base stocks, without significant desulfurization of said petroleum distillate feedstocks, especially the lube oil distillates or lube base stocks, while hydrotreating the oil to improve odor, color, improve stability, and the like. In accordance therewith, a supported, non (metal-promoted) carbon-containing molybdenum sulfide HDN/HDS selective hydrotreating catalyst is formed from a precursor composite made by compositing a preselected quantity of a porous, refractory inorganic oxide with a complex salt characterized by the formula $B_x[MoO_yS_{4-y}]$ where B is (a) an alkyl substituted diammonium ion, or (2) an alkyl substituted ammonium ion or quaternary ammonium ion; x is 1 where B is an alkyl substituted diammonium ion, or 2 where B is an alkyl substituted ammonium or quaternary ammonium ion; and y is 0, or a fraction or whole number ranging up to 3. The supported, non (metal-promoted) carbon-containing molybdenum sulfide HDN/HDS selected lube oil hydrotreating catalyst is then formed from the precursor composite by heating said composite so as to heat decompose the salt of said catalyst precursor composite in the presence of hydrogen, hydrocarbon and sulfur. Suitably, a solution of the salt, or admixture of salts, is incorporated with a preselected quantity of a porous, refractory inorganic oxide support, preferably a particulate mass of said support, the salt-containing support then preferably dried to remove all or a portion of the solvent from the support, and the dried particulate salt-containing support then heated in the presence of hydrogen, hydrocarbon, and sulfur or a sulfur-bearing compound to the decomposition temperature of said salt, or salts, to form a catalyst species suitable for the practice of this invention. Sufficient of the salt, or salts, is incorporated on the support so that prior to, or at the time the salt, or salts, is decomposed from about 5 percent to about 30 percent, preferably from about 10 percent to about 25 percent of the salt, expressed as weight $MoO_3$ on an ignition loss free basis, will be present on the support. The supported catalyst species is stable, highly active and is an HDN/HDS selective lube oil hydrotreating catalyst. Unlike the preferred hydrotreating catalysts described in Ser. Nos. 400,004 and 400,005 (now U.S. Pat. Nos. 4,431,747 and 4,430,443, respectively) which were additionally promoted with a Group VIII metal, or metals, the catalysts useful in the practice of this invention are not further metal promoted. Surprisingly, the non (metal-promoted) catalyst of this invention, which is formed by heat decomposition of the $B_x[MoO_yS_{4-y}]$ precursor in the presence of hydrogen, hydrocarbon and sulfur, is far more HDN selective than the preferred catalysts disclosed in Ser. Nos. 400,004 and 400,005 the more selective HDN species of which are formed by decomposition of the $B_x[MoO_yS_{4-y}]$ precursor in the presence of hydrogen and hydrogen sulfide.

The alkyl substituted diammonium substituents of the said complex salts, or B of the formula $B_x[MoO_yS_{4-y}]$, are represented by ionic forms of aliphatic diamines, or alkyldiamines which contain an amino group on two different carbon atoms of the molecule, and contain from 1 to about 30 carbon atoms, preferably from 1 to about 20 carbon atoms. Exemplary of these compounds are such alkylene diamines as 1,3 bis(amino)-n-propane, 1,3-bis(amino)-n-butane, 1,4-bis(amino)-n-hexane, 2,4 bis(amino)-n-hexane, 1,6-bis(amino)-n-hexane, and the like. Preferred of the alkyl substituted diammonium substituents of the said complex salts are those which contain an amino group on two different terminal atoms, i.e., an alpha omega alkylene diamine as defined by the formula $H_2N(CH_2)_nNH_2$ where n ranges from 1 to about 30, preferably 1 to about 20. Illustrative of these compounds are 1,4-bis(amino)-n-butane, 1,5-bis-(amino)-n-pentane, 1,7 bis(amino)-n-heptane, and the like. Suitable salts formed from such substituents are thus exemplified by $[H_3NC_3H_6NH_3][MoO_{0.5}S_{3.5}]$; $[H_3NC_6H_{12}NH_3][MoO_{0.3}S_{3.7}]$; $[H_3NC_8H_{16}NH_3][MoO_{0.5}S_{3.5}]$, and the like.

The alkyl substituted ammonium ion or alkyl substituted quaternary ammonium ion substituents of said complex salt, or B or the formula $B_x[MO_yS_{4-y}]$, are constituted of ammonium ions wherein one or more of the hydrogen atoms of the ions have been replaced by alkyl radicals, including such radicals when inertly substituted. The alkyl radical can contain from 1 to about 30 carbon atoms, preferably from about one to about 20 carbon atoms. Exemplary of substituents associated with, or substituted upon the ammonium or quaternary ammonium ion to form each of the two B constituents of the salt are methyl, ethyl, n-propyl, iso-propyl, n-butyl, i-butyl, sec-butyl, amyl, octyl, decyl, octadecyl, and the like. Typically inertly substituted groups may include 3-chloropropyl, 2-ethoxyethyl, 4-methyl hexyl, and the like. Substituted ammonium ions of such types are thus those containing one alkyl group, e.g., $n-C_4H_9NH_3^+$, $C_6H_{13}NH_3^+$, and the like; those containing two alkyl groups, e.g., $(C_2H_5)_2NH_2^+$, $(C_3H_7)_2NH_2^+$, and the like; those containing three alkyl groups, e.g., $n-(C_6H_{13})_3NH^+$, $(C_3H_7)_3NH^+$, and the like; and those containing four alkyl groups, e.g., $(C_6H_{13}CH_2)_4N^+$, $(C_7H_{15})_4N^+$, and the like. Suitable salts useful in the practice of this invention are thus exemplified by $[(C_2H_5)NH_3^+]_2[MoO_{0.4}S_{3.6}]$; $[(C_6H_{13})_2NH_2^+]_2[MoO_{0.4}S_{3.6}]$; $[(C_6H_{13})_2NH_2^+]_2[MoO_{0.1}S_{3.9}]$; $[(C_6H_{13})_3NH^+]_2[MoO_{0.2}S_{3.8}]$; $[(C_6H_{13})_4N^+]_2[MoO_{0.1}S_{3.9}]$; $[(C_6H_{13})_4N^+]_2[MoS_4]$, and the like.

The diammonium ion substituted, or ammonium or quaternary ammonium ion substituted thiomolybdate salt is preferably impregnated upon a porous, refractory, inorganic oxide support, suitably by first dispersing or dissolving said salt, or admixture of salts, in a suitable solvent, and then admixing or slurrying a preselected amount of the precursor thiomolybdate salt solution with a preselected quantity of said support material in particulate form. Virtually, any solvent can be employed which is capable of dissolving the precursor thiomolybdate salt, without adversely reacting therewith. Albeit, an aqueous solvent can be employed, non aqueous solvents are preferred because few of the diammonium ion substituted, or ammonium or quaternary ammonium ion substituted salts are adequately soluble in water. Suitable solvents for dissolving these salts are alcohols, ethers, ketones, paraffins, cycloparaffins and aromatic hydrocarbons, exemplary of which are methyl alcohol, ethyl alcohol, n-propyl alcohol, isopropyl alcohol, n-butyl alcohol, isobutyl alcohol, sec-butyl alcohol, t-butyl alcohol, ethyl ether, tetrahydrofuran, acetone, methyl ethyl ketone, hexane, heptane, cyclobutane, aromatic hydrocarbons, notably those having a single benzene nucleus, especially aromatic hydrocarbons containing from about 6 to about 9 carbon atoms, e.g., benzene, toluene, xylene, n-propyl benzene, isopropyl benzene, and the like; and cycloparaffin hydrocarbons which contain from about 4 to about 9 carbon atoms, e.g., cyclobutane, cyclopentane, cyclohexane, cycloheptane, and the like. Preferred solvents are alcohols, especially the low molecular weight simple alcohols, e.g., methyl alcohol, ethyl alcohol, and the like; amines, e.g., butyl amine, ethylenediamine, and the like; and ketones, e.g., acetone, methylethyl ketone and the like.

The diammonium ion substituted, or ammonium or quaternary ammonium ion substituted thiomolybdate, salt is composited or otherwise intimately associated with the porous, inorganic oxide support by various techniques known to the art, such as coprecipitation, impregnation or the like. The composite is preferably formed from a solution of the desired salt, or salts by impregnation of the support, typically via an "incipient wetness" technique which requires a minimum of solution so that the total solution with the preselected desired amount of the catalyst precursor salt is adsorbed, initially or after some evaporation. Typically, a particulate porous refractory inorganic oxide, notably alumina, in the form of beads, pills, pellets, seived particles, extrudates, or the like, in dry or solvated state, is contacted with a solution of the salt, or admixture of the salts, with the result that the salt solution is adsorbed into the particulate material in the desired amount. The salt-containing particulate material can thereafter be heated and dried at low temperature, with or without vacuum assistance, e.g., at temperatures ranging at or below the boiling temperature of the solvent.

The preferred support is alumina, and the composite support can contain for example, one or more of alumina, bentonite, clay, diatomaceous earth, zeolite, silica, activated carbon, magnesia, zirconia, thoria, titania, and the like, these latter with alumina, usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The catalyst precursor material, or material formed by impregnation of the support with the diammonium ion substituted, or substituted ammonium or quaternary ammonium ion is preferably dried to remove all or a portion of the solvent, but it is never calcined after the salt is added to the support. The support is preferably dried at a temperature below about 100° C., more preferably between 50° C. and 80° C., in the presence of nitrogen or oxygen, or both, at static or dynamic conditions, in air or under vacuum. The catalyst precursor material, on a dry basis, contains from about 5 percent to about 30 percent, preferably from about 10 percent to about 25 percent of the undecomposed organo or hydrocarbyl diammonium ion substituted, ammonium or quaternary ammonium ion substituted, or ionic form of a basic cyclic amine substituted thiomolybdate, or thiotungstate, salt, expressed as weight $MoO_3$ on an ignition loss free basis.

The catalyst precursor is heated to the decomposition temperature of the impregnating salt, and the salt decomposed in the presence of hydrogen, and a hydrocarbon and sulfur, or sulfur-bearing compound, to form the supported catalyst species of this invention. The nature of the hydrocarbon is not critical, and can generally include any hydrocarbon compound, acyclic or cyclic, saturated or unsaturated, unsubstituted or inertly substituted hydrocarbon. The preferred hydrocarbons are those which are liquid at ordinary temperatures, exemplary of which are such straight chain saturated acyclic hydrocarbons as octane, dodecane, hexadecane, or the like; straight chain unsaturated acyclic hydrocarbons as 2-hexene, 1,4-hexadiene, and the like; branched chain saturated acyclic hydrocarbons as 3-methyl pentane, neopentane, isohexane, 2,7,8-triethyl decane, and the like; branched chain unsaturated acyclic hydrocarbons such as 3,4-dipropyl-1,3-hexadien-5-yne, 5,5-dimethyl-1-hexene, and the like; cyclic hydrocarbons, saturated or unsaturated, such as cyclohexane, decahydronaphthalene, tetrahydronaphthalene, 2-methyl naphthalene, and the like; and including such aromatics as cumene, mesitylene, styrene, toluene, o-xylene, or the like. The more preferred hydrocarbons are those derived from petroleum, including especially admixtures of petroleum hydrocarbons characterized as virgin naphthas, cracked naphthas, Fischer-Tropsch naphthas, light cat cycle oil, heavy cat cycle oil, and the like, typically those containing from about 5 to about 30 carbon atoms, preferably from about 5 to about 20 carbon atoms and boiling within a range of from about 30° C. to about 450° C., preferably from about 150° C. to about 300° C.

The sulfur, or sulfur-bearing compound is characterized as an organo-sulfur, or hydrocarbyl-sulfur compound which contains one or more carbon-sulfur bonds within the total molecule, and generally includes acyclic or cyclic, saturated or unsaturated, unsubstituted or inertly substituted compounds. Exemplary of acyclic compounds of this character are ethyl sulfide, n-butyl sulfide, n-hexyl thioalcohol, dimethyl disulfide, dimethyl sulfone, dimethyl sulfoxide, and the like; cyclic compounds of such character are methylthiobenzene, methyl dithiobenzene, thiophene, benzothiophene, 5-formamido-benzothiozole, 1-naphthalenesulfonic acid, dibenzylthiophene, and the like. Suitably, the sulfur concentration of the feed ranges from about 0.01 percent to about 30 percent, preferably from about 0.1 to about 3 percent, based on the total weight of the feed. Suitably, both the hydrocarbon and sulfur for the reaction can be supplied by the use of a heterocyclic sulfur compound, or compounds. Exemplary of heterocyclic sulfur compounds suitable for such purpose are thiophene, dibenzothiophene, tetraphenylthiophene, tetramethyldibenzothiophene, tetrahydrodibenzothiophene, thianthrene, tetramethylthianthrene, and the like. The hydrogen required for forming the catalysts of this invention may be pure hydrogen, an admixture of gases rich in hydrogen, or a compound which will generate in situ hydrogen, e.g., hydrogen-bearing gas such as hydrogen sulfide, or a hydrogen donor solvent.

In decomposing the catalyst precursor, a bed of the dried catalyst precursor is contacted in a hydrogen atmosphere with the hydrocarbon and sulfur, or sulfur-bearing compound, and heated at conditions which decompose the diammonium ion substituted, ammonium or quaternary ammonium ion substituted thiomolybdate salt component of said catalyst precursor. For example, a fixed bed of the dried catalyst precursor is charged into a reaction vessel and contacted with a liquid hydrocarbon, or admixture of liquid hydrocarbons, generally at a flow rate of hydrocarbon:catalyst precursor of from about 0.05 to about 50, preferably from about 0.1 to about 10, volumes of hydrocarbon per volume of catalyst per hour, a flow rate of hydrogen ranging from about 250 to about 5000 SCF/Bbl, preferably from about 500 to about 3000 SCF/Bbl, and at pressures ranging from about 50 to about 4000 pounds per square inch gauge (psig), preferably 150 to about 2500 psig. Typically the hydrocarbon is introduced downflow, but can be introduced upflow or downflow over the bed of catalyst precursor, with the organo, or hydrocarbyl sulfur compound being added to the hydrocarbon feed. The organo, or hydrocarbyl sulfur compound is added in sufficient quantity to the feed such that the sulfur content of the feed ranges from about 0.01 percent to about 30 percent, preferably from about 0.1 percent to about 3 percent, calculated as elemental sulfur based on the weight of the hydrocarbon feed. The temperature of the reaction is gradually raised until the decomposition temperature of the diammonium ion substituted, or ammonium or quaternary ammonium ion substituted thiomolybdate salt component is reached, at which time the temperature is held substantially constant until the decomposition reaction is completed. Typically the decomposition temperature of the diammonium ion substituted, or ammonium or quaternary ammonium ion substituted thiomolybdate salt decomposes generally at peak operating temperatures ranging between about 150° C. and 400° C., more often between about 200° C. and 370° C.

In the preparation of the catalysts of this invention, the salts of the catalyst precursor composite are decomposed in an atmosphere of hydrogen, and in the presence of hydrocarbon and sulfur; the latter species of which can be provided by a sulfur-containing hydrocarbon species, or separately by a hydrocarbon compound, or compounds, and sulfur or a sulfur-containing compound, or compounds. The salts of the catalyst precursor composite decompose at temperatures ranging between about 150° C. and 400° C., and more generally between about 200° C. and 350° C. which temperatures correspond generally with, or are exceeded by lube oil hydrotreating temperatures. Where, however, the decomposition temperature of the catalyst precursor is lower than the desired lube oil hydrotreating temperature, the temperature in conducting the lube oil hydrotreating process is raised to that which is desired for conducting the lube oil hydrotreating operation. In a typical operation, lube oil hydrotreating conditions are provided as regards hydrogen pressures, space velocities and hydrogen gas recycle rates, and the temperature is gradually raised to the decomposition temperature of the catalyst precursor, the catalyst precursor is decomposed in the presence of the hydrogen, hydrocarbon, and sulfur to form the catalytically active species, and the temperature then further increased as desired to conduct the lube oil hydrotreating operation.

The lube oil hydrotreating operation can be conducted by hydrotreating the lube oil base stock per se, or narrow boiling range fraction which has been cut from a wider boiling range hydrocarbon feedstock, before or after the dewaxing of the lube oil base stock. Conversely, the whole wide boiling range hydrocarbon feedstock can be hydrotreated and the lube oil base stock, or lube oil base stocks, then separated from said wide boiling range hydrocarbon feedstock; and said wide boiling range hydrocarbon feedstock can be hydrotreated before or after dewaxing.

The conditions at which the hydrotreating operation are conducted vary to some extent depending on the nature of the feed which is hydrotreated, the nature and concentration of the impurities which are to be removed, and the extent of the desired hydrocarbon conversion. In general, the hydrotreating is conducted at the following conditions in the treatment of a lube base stock, or a feedstock boiling within the high mid distillate to low vacuum gas oil range, to wit:

| Feed | Conditions | Temperature °C. | Pressure psig | Space Velocity V/V/Hr | Hydrogen Gas Rate SCF/B |
|---|---|---|---|---|---|
| Lube Base Stock | Typical | 200–450 | 100–3000 | 0.2–5 | 100–10,000 |
| | Preferred | 230–410 | 250–2500 | 0.5–2 | 300–5,000 |
| Mid-Distillate | Typical | 200–430 | 50–1500 | 0.2–10 | 100–4,000 |
| | Preferred | 250–390 | 150–1000 | 0.5–4 | 500–3,000 |
| Vacuum Gas Oil | Typical | 200–450 | 200–3000 | 0.1–4 | 300–10,000 |
| | Preferred | 230–410 | 400–2400 | 0.3–2 | 800–5,000 |

Whereas the catalysts described in Ser. No. 400,004, supra, can be promoted to further dramatically increase the activity of the finished catalyst by the further addition of a Group VIII metal of the Periodic Table of the Elements (E. H. Sargent & Co., Copyright 1962, Dyna-Slide Co.), iron, cobalt, and nickel, alone or in admixture one metal with another, promotion of the catalyst used in the process of this invention is not desirable because metal promotion of the catalyst has been found to increase the hydrodesulfurization activity of the catalyst which is undesirable.

The following examples, with comparative demonstrations, are further exemplary of the highly active, highly HDN/HDS selective catalysts of this invention for use in hydrodenitrogenation of lube oils and lube oil distillates. In the examples and demonstrations which follow, all parts are in terms of weight units, pressures in terms of pounds per square inch absolute, temperatures are expressed in terms of degrees Centigrade, gas flow rates in terms of SCF/Bbl, and liquid flow rates in terms of LHSV except as otherwise specified.

EXAMPLE I

A masterbatch of tetrabutylammonium thiomolybdate supported on alumina was prepared as follows: A solution was made by dissolving 64.0 gm of tetrabutylammonium thiomolybdate in enough methanol to provide 160 ml of solution. Analysis of the tetrabutylammonium thiomolybdate indicated that it had the approximate formula $((C_4H_9)_4N)_2(MoO_{0.4}S_{3.6})\cdot H_2O$. A 90 ml portion of this solution was used to impregnate to incipient wetness 83.5 gm of γ-alumina. The alumina had 265.7 m²/gm surface area and 0.750 ml/gm pore volume, and had been ground and screened to 14/35 Tyler mesh, and calcined for 4 hours at 540° C. before impregnation. The alumina was dried overnight in a vacuum desiccator, impregnated with the remaining 70 ml of solution, and dried again in the same manner. The 142.64 gm of impregnated alumina so prepared analyzed 11.90 wt.% Mo as $MoO_3$, on an ignition-loss-free basis.

Two catalysts, A and B, were both prepared from this same batch of impregnated alumina. Catalyst A was prepared by heating 40 ml (33.23 g) of the impregnated alumina in a packed-bed reactor in a flow of 20 std liters/hr of 10% $H_2S$/hydrogen at atmospheric pressure. The catalyst was first heated to 200° C., held at that temperature for two hours, then heated to 330° C. and held at that temperature overnight. This produced 21.79 gm of finished catalyst.

Catalyst B was prepared according to the teachings of the present invention, by heating another 40 ml portion of the impregnated alumina (33.20 g) in a packed-bed reactor at 500 psig in a liquid flow of 40 ml/hr of 5% dibenzothiophene dissolved in decalin and a gas flow of 6.4 std liters/hr of 100% hydrogen. This catalyst was also first heated to 200° C., held at that temperature for two hours, then heated to 330° C. and held at that temperature overnight. This produced 22.05 gm of finished catalyst.

The activities of catalysts A and B were determined in a batch autoclave test, hydrotreating a blend of pure compounds which simulated a petroleum lube feedstock. This blend consisted of 4.5 wt.% dibenzothiophene, 20 wt.% 1-methyl naphthalene, and 1.1 wt.% 2,6-dimethyl quinoline in a hexadecane solvent. The test conditions were: 10 ml of catalyst, 200 ml of feed blend, 350° C., 500 psig, and 6 std liters/hr of flow-through hydrogen gas. Activities were calculated as the first-order rate constants for sulfur and nitrogen removal. To simplify comparison, these have been expressed as percentages of the rate constants of a conventional commercial catalyst at the same conditions. The conventional catalyst contained 3.22 wt.% CoO and 12.81 wt.% $MoO_3$, and had 349 $m^2$/gm surface area and 0.471 ml/gm pore volume.

According to the teachings of application Ser. No. 400,004, supra, catalysts prepared like catalyst B, but promoted with a suitable group VIII metal, would be expected to have much higher desulfurization activity than promoted catalysts prepared like catalyst A. According to the same teachings, both would be approximately equal in denitrogenation activity. Thus, catalyst A would be expected to have a greater HDN/HDS selectivity.

In fact, however, catalyst A had a desulfurization activity of 1, relative to 100 for the conventional catalyst, and a denitrogenation activity less than 1. Catalyst B had a desulfurization activity of 5, and a denitrogenation activity of 29. The selectivity of catalyst A for HDN relative to HDS was even less than the selectivity of the conventional catalyst, and the activity was too low for any practical purpose. On the other hand, the selectivity of catalyst B, the catalyst of this invention, was 5.8 times higher than the selectivity of the conventional catalyst.

EXAMPLE II

Another sample of tetrabutylammonium thiomolybdate supported on alumina was prepared in the same manner as in Example I, except that all quantities were doubled. Analysis of this particular tetrabutylammonium thiomolybdate indicated that it had the approximate formula $((C_4H_9)_4N)_2(MoS_4).0.5H_2O$. The 296.4 gm of impregnated alumina so prepared analyzed 12.91 wt.% $MoO_3$, on an ignition-loss free basis. Catalyst C was prepared by (1) thermally decomposing 240 ml (180 gm) of this impregnated alumina in the same manner as catalyst A (the flow rate of 10% $H_2S$/hydrogen was increased proportional to the volume, to 120 std liters/hr), and then (2) discharging in an inert atmosphere and impregnating with 14.6 gm of nickel nitrate, dissolved in acetone to a total volume of 112 ml, and drying in a vacuum desiccator overnight. The finished catalyst C contained 11.68 wt.% $MoO_3$ and 1.80 wt.% Ni, on the ignition-loss free basis. Ignition loss was 13.05 wt.%.

Still another sample of tetrabutylammonium thiomolybdate supported on alumina was prepared with a slightly higher molybdenum content. A solution was made by dissolving 84.0 gm of tetrabutylammonium thiomolybdate in enough methanol to give 150 ml of solution. Analysis of this particular tetrabutylammonium thiomolybdate indicated that it also had the approximate formula $((C_4H_9)_4N)_2(MoS_4).0.5H_2O$. An 85 ml portion of this solution was used to impregnate to incipient wetness 78.5 g of γ-alumina. A slightly different γ-alumina was used in this preparation. It had 255.1 $m^2$/gm surface area and 0.684 ml/gm pore volume, and was also ground and screened to 14/35 Tyler mesh, then calcined 4 hours at 540° C. before impregnation. The alumina was dried, impregnated with the remaining solution, and dried again in the same manner as in Example I. This impregnated alumina contained 16.14 wt.% $MoO_3$, on an ignition-loss free basis. Catalyst E was prepared from it by thermal decomposition at 500 psig in flowing 5% dibenzothiophene/decalin and hydrogen, at the same conditions as catalyst B. This decomposition was carried out in the hydrotreating reactor immediately prior to the activity test, so it was not feasible to obtain analyses on the finished catalyst E.

The catalytic activities of catalysts C and E were measured in a conventional fixed-bed hydrotreating reactor containing 20 ml of catalyst, operated in an upflow mode at 325° C., 750 psig, and 1500 SCF/B 100% hydrogen treat gas rate. The space velocity was varied from 0.5 to 2.0 V/H/V, to obtain a wide variety of conversions. The test feedstock was a Baton Rouge light catalytic cycle oil (LCCO) designated FS-4754. Inspections on the LCCO feedstocks used in this and other examples are shown in Table I.

TABLE I

| LCCO FEEDSTOCK DATA | | |
|---|---|---|
| Feedstock No. | FS-4754 | FS-5171 |
| API Gravity | 19.3 | 15.6 |
| Sulfur, wt. % | 1.48 | 1.74 |
| Nitrogen, ppm. | 327 | 274 |
| Bromine No., mg/cc | 4.4 | 5.6 |
| Carbon, wt. % | 88.51 | 88.81 |
| Hydrogen, wt. % | 9.98 | 9.42 |
| FIA Aromatics | 71.0 | |
| Olefins | 2.5 | |
| Saturates | 27.0 | |
| Distillation | | |
| 5% | 473° F. | 465° F. |
| 50% | 538 | 516 |
| 95% | 634 | 642 |

Volumetric activity was measured as the reciprocal space velocity required to reach a given desulfurization or denitrogenation target. These were then expressed relative to the reciprocal space velocity required for a conventional commercial catalyst to reach the same target, and relative activities remained constant over a wide range of HDS or HDN conversions. The conventional catalyst used for comparison in all the LCCO tests contained 4.08 wt.% CoO and 15.86 wt.% $MoO_3$, and had 235 $m^2$/g surface area and 0.480 ml/g pore volume.

In this test, catalyst C, a highly HDN selective catalyst according to the teachings of application Ser. No. 400,004, had an HDN activity of 127 and an HDS activity of 23, relative to 100 for the conventional catalyst, thus having a very good selectivity 127/23=5.52. However, catalyst E, made according to the teachings of the present invention, had an HDN activity of 59 and an HDS activity of only 0.54. Even though the HDN activity is rather modest, the selectivity 59/0.54=109 is far higher than that of catalyst C.

EXAMPLE III

Two batches of hexanediamine thiomolybdate supported on alumina were prepared as follows. Two solutions were made by dissolving 50.0 gm of hexanediamine thiomolybdate in 165 ml of butylamine, and filtered. Analysis of the hexanediamine thiomolybdate indicated that it had the approximate formula $(H_3NC_6H_{12}NH_3)(MoS_4) \cdot 0.4H_2O$. A 95 ml portion of the first solution was used to impregnate to incipient wetness 90.23 gm of the same $\gamma$-alumina used for catalyst E. The alumina was dried overnight in a vacuum oven under flowing nitrogen at 45° C. and 5–10 psia. It was then impregnated with the remainder of the first solution and dried again in the same manner. The finished first batch of impregnated alumina weighed 146.88 gm. A 100 ml portion of the second solution was used to impregnate to incipient wetness another 95.14 gm of this same $\gamma$-alumina. This second batch of alumina was dried, impregnated with the remainder of the second solution, and dried again in the same manner as the first batch of impregnated alumina. When finished, it weighed 151.74 gm. Both impregnated aluminas so prepared contained about 4.3 wt.% carbon and 12.0 wt.% sulfur, on an as-received basis. They also analyzed about 17.2 wt.% $MoO_3$, on an ignition-loss free basis, with an ignition loss of about 25 wt.%.

Catalyst D was prepared from the first batch of impregnated alumina by (1) further impregnating with 15.86 gm of cobalt nitrate dissolved in enough acetone to give 45 ml of solution, and drying in a vacuum oven at the same conditions, and then (2) thermally decomposing the thiomolybdate in the hydrotreating reactor in the same manner as catalyst A. After drying, but before the thermal decomposition, catalyst D analyzed 3.83 wt.% Co as CoO, on an ignition-loss-free basis.

Catalyst F was prepared from the second batch of impregnated alumina by thermally decomposing the thiomolybdate at 500 psig in flowing 5% dibenzothiophene/decalin and hydrogen, at the same conditions as for catalyst B. This decomposition was also carried out in the hydrotreating reactor immediately prior to the activity test, so it was not feasible to obtain analyses on the finished catalyst F.

The catalytic activities of catalysts D and F were measured in exactly the same manner and at the same conditions as described in Example II. Catalyst D, another highly HDN selective catalyst according to the teachings of application Ser. No. 400,004, had an HDN activity of 83 and an HDS activity of 9, relative to the same conventional catalyst, for an HDN selectivity of 83/9=9.2. Catalyst F, made according to the teachings of the present invention, had an HDN activity of 79 and an HDS activity of only 0.58, for an HDN selectivity of 79/0.58=136.

Thus, whether the sulfided catalyst precursor is tetrabutylammonium thiomolybdate (Example II) or hexanediamine thiomolybdate (Example III), and whether the promoter is applied before (Example III), or after (Example II) the thermal decomposition, and whether the promoter is Ni (Example II) or Co (Example III), catalysts made according to the teachings of this invention have substantially higher HDN selectivities than catalysts made according to the teachings of application Ser. No. 400,004.

EXAMPLE IV

Another catalyst, G, was prepared with a composition similar to catalysts, B, E, and F, but in a conventional manner, as follows. A solution was made by dissolving 19.61 gm of ammonium heptamolybdate in 5 ml of concentrated ammonium hydroxide and enough deionized water to make 80 ml of solution. The solution was allowed to stand for two hours, and then used to impregnate to incipient wetness 84.0 gm of the same $\gamma$-alumina used in Example III. The preparation was stirred frequently for two hours, allowed to stand covered at room temperature overnight, dried for 24 hours at 80° C., and then calcined for 4 hours at 540° C. to make catalyst G. The finished catalyst contained 14.63 wt.% $MoO_3$.

Two hydrotreating tests were made on catalyst G. In the first test, the catalyst was presulfided at 500 psig in flowing 5% dibenzothiophene/decalin, at the same conditions as catalyst B. The activity measurement was made at the same conditions as in Example II, but using a second Baton Rouge LCCO feedstock, FS-5171 (Table I). The commercial conventional catalyst was also treated on this feedstock, so that the relative activities would not be affected by any differences between the two feedstocks. The relative HDN activity of catalyst G was 44 and the relative HDS activity was 0.78, for an HDN selectivity 44/0.78=56.

In the second hydrotreating test, the catalyst was presulfided in the conventional manner, in 10% $H_2S$/hydrogen, at the same conditions used for the thermal decomposition of catalyst A. The hydrotreating conditions were the same as before, and the feed was again FS-5171. With this presulfiding procedure, catalyst G had a relative HDN activity of 41 and a relative HDS activity of 0.48, for an HDN selectivity of 41/0.48=85. While the selectivity of catalyst G is very good, it is not as high as either catalyst E or catalyst F, and furthermore, the HDN activity of catalyst G is decidedly inferior to either of those catalysts.

These examples have demonstrated that decomposition of unpromoted supported sulfided precursor catalysts in the presence of a sulfur-containing hydrocarbon gives a higher HDN selectivity than decomposition in the presence of $H_2S$ (Example I), contrary to the teachings of application Ser. No. 400,004 concerning promoted catalysts. The presented data have also demonstrated that the HDN selectivity of said unpromoted catalysts is far superior to that of said promoted catalysts (Examples II and III), albeit the actual HDN activity may be somewhat less. Finally, these data have demonstrated that both HDN selectivity and HDN activity of said unpromoted Supported Sulfided Precursor catalysts are superior to those of a conventionally prepared unpromoted catalyst of the same nominal composition (Example IV).

EXAMPLE V

Another catalyst, H, was prepared exactly like catalyst D, except that it was promoted with nickel nitrate rather than cobalt nitrate. Catalyst H, catalysts D and F from Example III, and a conventional Ni/Mo catalyst, were tested hydrotreating an actual typical lube feedstock, LFS-5-82. When this test was over, catalysts D, F, and the conventional Ni/Mo catalyst were further tested hydrotreating an unusually difficult lube feedstock with very little feed sulfur, LFS-2-82. It is particularly difficult to remove enough nitrogen from this second lube feedstock and still leave enough sulfur in, since there is so little sulfur to start with. Inspections on the lube feedstocks are shown in Table II.

TABLE II
Lube Feedstock Inspections

| Feedstock Number | LFS-5-82 | LFS-2-82 |
| --- | --- | --- |
| X-Ray Sulphur, wt. % | 0.74 | 0.19 |
| Dohrman Sulphur, wppm | — | — |
| Total Nitrogen, wppm | 26 | 39 |
| Basic Nitrogen, wppm | 22 | 41 |
| NMR Hydrogen, wt. % | 13.63 | 13.77 |
| Aromatic Carbon ($C_A$), wt. % | 7.2 | 6.7 |
| LST Saturates, wt. % | 69.1 | 79.1 |
| LST Aromatics + Polars, wt. % | 29.5 | 19.4 |
| LST Recovery | 98.6 | 98.5 |
| Density at 15° C., kg/dm$^3$ (D 287-67) | 0.8703 | 0.8698 |
| API Gravity at 60° F., (D 287-67) | 31.0 | 31.1 |
| Viscosity at 40° C., cSt (D 445) | 31.46 | 29.82 |
| Viscosity at 100° C., cSt (D 445) | 5.36 | 5.14 |
| Viscosity Index (D 2270) | 103 | 100 |
| Colour (D 1500-64) | 0.5 | <1.0 |
| Pour, °C. (D 97) | −17 | −9 |
| Distillation (D 2887) | | |
| (Wt. % off at °C.) | | |
| IBP/1 | 329/340 | 342/349 |
| 5/10 | 370/384 | 369/381 |
| 20/30 | 403/416 | 395/405 |
| 40/50 | 427/437 | 414/422 |
| 60/70 | 446/455 | 431/440 |
| 80/90 | 465/477 | 451/466 |
| 95/99 | 487/507 | 480/507 |
| FBP | 516 | 518 |

The conventional Ni/Mo catalyst was chosen because it had shown unusually good HDN selectivity in lube feedstock hydrotreating screening tests among a large number of commercially available catalysts. It contained 20.5 wt.% MoO$_3$ and 5.0 wt.% NiO, and had 160 m$^2$/g surface area and 0.44 ml/g pore volume.

These tests were carried out in conventional fixed-bed hydrotreating reactors containing 100 ml of catalyst, operated in a downflow mode at 1.0 V/V/Hr, 600 psig, and 500 SCF/B 100% hydrogen treat gas rate. The temperature was varied as required to achieve either 50% nitrogen removal or 50% sulfur removal. The selectivity was evaluated as the basic nitrogen removal at 50% sulfur removal, and the activity was evaluated from the temperature required to achieve 50% basic nitrogen removal. The results for LFS-5-82, after about 500 hours of reactor operation, and for LFS-2-82, after 750–1500 hours of reactor operation, are shown in Table III.

TABLE III

| Catalyst | % Basic N Removal at 50% S Removal | | Temperature (°C.) for 50% Basic N Removal | |
| --- | --- | --- | --- | --- |
| | LFS-5-82 | LFS-2-82 | LFS-5-82 | LFS-2-82 |
| Conv Ni/Mo | 20 | 15 | 285 | 270 |
| D, Co/Mo | 35 | 25 | 313 | 305 |
| H, Ni/Mo | 35 | NA | 328 | NA |
| F, Unprom. | 55 | 40 | 342 | 334 |

On both of these actual lubestock feeds, catalyst F, the catalyst of this invention, albeit it shows the lowest overall activity, has a far higher HDN/HDS selectivity than the very selective conventional catalyst, even higher than catalysts D and H made according to the teachings of application Ser. No. 400,004.

It is apparent that various modifications and changes can be made without departing the spirit and scope of the present invention.

Having described the invention, what is claimed is:

1. A process for the hydrotreating and selective removal of nitrogen from petroleum distillate feedstocks without significant desulfurization which comprises contacting said feed at hydrotreating conditions with a supported, non (metal-promoted) carbon-containing molybdenum sulfide hydrotreating catalyst formed by the steps comprising compositing a preselected quantity of a porous, refractory inorganic oxide with a salt characterized by the formula $$B_x[MoO_yS_{4-y}]$$

where B is (a) an alkyl substituted diammonium ion, or (2) an alkyl substituted ammonium ion or quaternary ammonium ion; x is 1 where B is an alkyl substituted diammonium ion, or 2 where B is an alkyl substituted ammonium or quaternary ammonium ion; and y is 0, or a fraction or whole number ranging up to 3, and heat decomposing the salt of said catalyst precursor composite in the presence of hydrogen, hydrocarbon and sulfur to form said supported, non (metal-promoted) carbon-containing molybdenum sulfide hydrotreating catalyst.

2. A process for the hydrotreating and selective removal of nitrogen from lube oil distillates or a lube base-stock feed without significant desulfurization which comprises contacting said feed at hydrotreating conditions with a supported, non (metal-promoted) carbon-containing molybdenum sulfide hydrotreating catalyst formed by the steps comprising compositing a preselected quantity of a porous, refractory inorganic oxide with a salt characterized by the formula $$B_x[MoO_yS_{4-y}]$$

where B is (a) an alkyl substituted diammonium ion, or (2) an alkyl substituted ammonium ion or quaternary ammonium ion; x is 1 where B is an alkyl substituted diammonium ion, or 2 where B is an alkyl substituted ammonium or quaternary ammonium ion; and y is 0, or a fraction or whole number ranging up to 3, and heat decomposing the salt of said catalyst precursor composite in the presence of hydrogen, hydrocarbon and sulfur to form said supported, non (metal-promoted) carbon-containing molybdenum sulfide hydrotreating catalyst.

3. The process of claim 2 wherein the supported, non-metal promoted carbon-containing molybdenum hydrotreating catalyst precursor composite, prior to decomposition of the salt, contains from about 5 percent to about 30 percent of the salt, calculated as MoO$_3$ on an ignition loss free basis.

4. The process of claim 3 wherein the catalyst precursor composite is heated at temperatures ranging from about 150° C. to about 400° C. to heat decompose the salt of said composite.

5. The process of claim 4 wherein the decomposition temperature ranges from about 200° C. to about 370° C.

6. The process of claim 3 wherein the decomposition temperature ranges from about 150° C. to about 400° C., the salt impregnated catalyst precursor composite is contacted with hydrogen at a flow rate ranging from about 250 to about 5000 SCF/Bbl, at pressures ranging from about 50 to about 4000 psia, and with a liquid feed hydrocarbon at a flow rate of hydrocarbon:catalyst precursor of from about 0.05 to about 50 volumes of hydrocarbon per volume of catalyst per hour, and the added sulfur is equivalent to a sulfur content which ranges from about 0.01 to about 30 percent, calculated as elemental sufur based on the weight of the hydrocarbon feed.

7. The process of claim 6 wherein the flow rate of the hydrogen ranges from about 500 to about 5000 SCF/Bbl, the pressure ranges from about 150 to about 2500 psia, the flow rate of the liquid hydrocarbon ranges from about 0.1 to about 10, and the concentration of sulfur ranges from about 0.1 percent to about 3 percent.

8. The process of claim 3 wherein the porous, refractory inorganic oxide is alumina.

9. The process of claim 3 wherein the porous, refractory inorganic oxide is particulate alumina, the salt is dissolved in a solvent, and the particulate alumina and salt solution are contacted together and the particulate alumina impregnated with the salt solution, the impregnated alumina is dried to remove the solvent, and the dry, salt-impregnated alumina heated to a temperature sufficient to decompose the salt and form said supported, non-metal promoted carbon-containing molybdenum sulfide hydrotreating catalyst.

* * * * *